Figure 1:
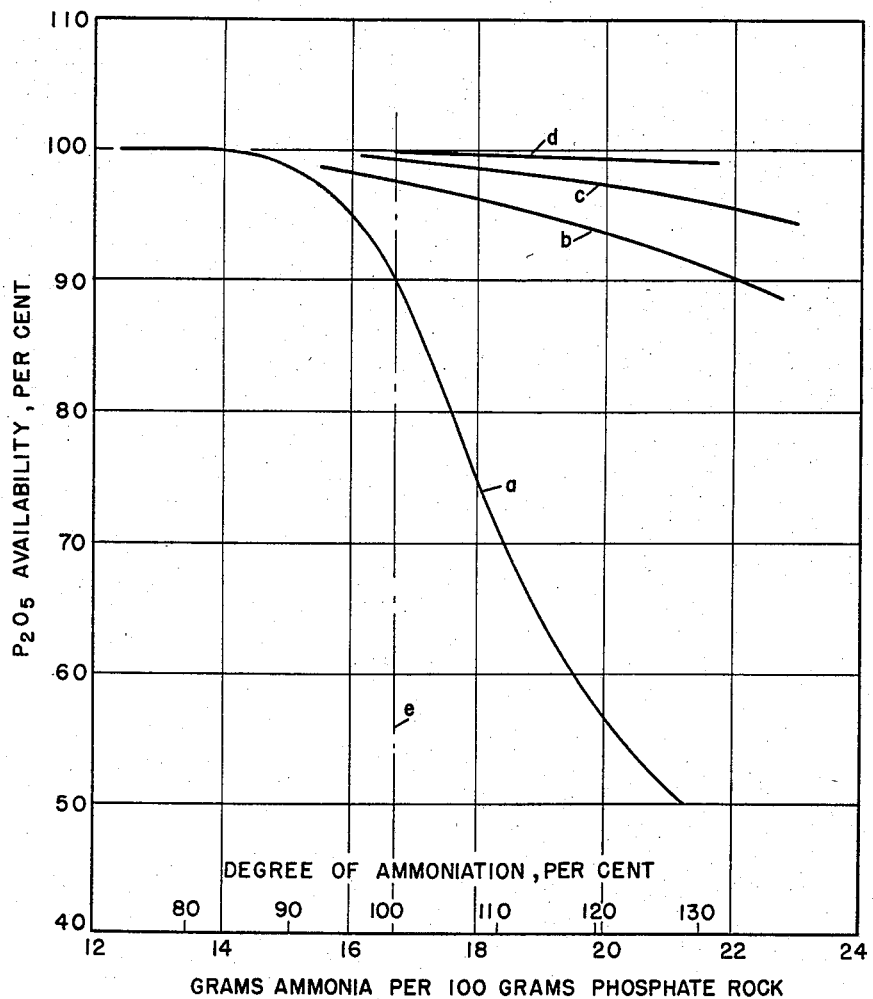

FIG. I

March 24, 1959 F. T. NIELSSON 2,879,153
PRODUCTION OF FERTILIZER
Filed Nov. 7, 1951 2 Sheets-Sheet 2

FRANCIS T. NIELSSON INVENTOR.

BY Bentley Morrow
Attorney

United States Patent Office 2,879,153
Patented Mar. 24, 1959

---

2,879,153

PRODUCTION OF FERTILIZER

Francis T. Nielsson, Sheffield, Ala., assignor to Tennessee Valley Authority, a corporation of the United States Application November 7, 1951, Serial No. 255,296

2 Claims. (Cl. 71—39)

(Granted under Title 35, U. S. Code (1952), sec. 266)

The invention herein described may be manufactured and used by or for the Government for governmental purposes without payment to me of any royalty thereon.

This invention relates to improved methods for the production of fertilizer. It is particularly useful in producing fertilizer from phosphate rock, nitric acid, ammonia, and potassium sulfate.

Processes are known in which phosphate rock is acidulated with nitric acid, and the acid extract is treated with ammonia and with potassium sulfate. The following series of reactions, in which the formula for fluorapatite, $Ca_{10}(PO_4)_6F_2$, is used to designate phosphate rock, illustrate in a general way the chemistry involved in these processes:

(1) $Ca_{10}(PO_4)_6F_2 + 16HNO_3 \rightarrow 2CaH_4(PO_4)_2$
$\qquad + 2H_3PO_4 + 8CA(NO_3)_2 + 2HF$ (2) $2CaH_4(PO_4)_2 + 2H_3PO_4 + 8Ca(NO_3)_2 + 2HF$
$\qquad + 10NH_3 \rightarrow 6CaHPO_4 + 10NH_4NO_3 + 3Ca(NO_3)_2 + CaF_2$ (3) $6CaHPO_4 + 10NH_4NO_3 + 3Ca(NO_3)_2$
$\qquad + CaF_2 + 3K_2SO_4 \rightarrow 6CaHPO_4$
$\qquad + 10NH_4NO_3 + 6KNO_3 + 3CaSO_4 + CaF_2$ The amount of nitric acid employed may differ from that shown in Reaction 1. From 14 to 20 moles of $HNO_3$ per mole of $Ca_{10}(PO_4)_6F_2$ may be used, depending upon the ratio of nitrogen to phosphorus that is desired in the final fertilizer. If 14 moles of nitric acid are used in Reaction 1, 8 moles of ammonia are required in Reaction 2; 14 moles of ammonia are required if 20 moles of nitric acid are used for acidulation. The requirement for potassium sulfate is independent of the amount of nitric acid employed.

In addition to providing potash in the fertilizer, potassium sulfate serves to eliminate undesirable calcium nitrate from the product. Calcium nitrate is highly hygroscopic, and its presence in fertilizer causes it to have poor physical qualities. The effect of potassium sulfate is to decompose calcium nitrate to form potassium nitrate and calcium sulfate.

Extensive studies of the process outlined above have shown that ammoniation of the acid extract of Reaction 1 and drying of the products of Reaction 3 are the most difficult steps in the operation.

It is important that sufficient ammonia be added to the acid extract to precipitate all $P_2O_5$ present as dicalcium phosphate, and all fluorine as calcium fluoride. It is difficult to accomplish this, however, without forming phosphate compounds that are insoluble in neutral ammonium citrate according to the accepted A.O.A.C. method.

Unless all the stoichiometric requirement of ammonia, as illustrated in Reaction 2, is added to the acid extract, the following undesirable results will be obtained:

(a) The product will contain some monocalcium phosphate. On heating the product to remove moisture, the monocalcium phosphate will react with the calcium nitrate salts present to form dicalcium phosphate, with attendant evolution and loss of nitrogen oxides.

(b) The ammoniated slurry will contain more calcium nitrate than it would if the stoichiometric amount of ammonia had been added. Thus, more potassium sulfate, which is a costly source of potash as compared to potassium chloride, is required to eliminate the calcium nitrate.

It would be highly desirable, from an economic standpoint, to be able to add more than the stoichiometric amount of ammonia to the acid extract of Reaction 1 without reducing the solubility of the $P_2O_5$ below about 95 percent. This would permit incorporation in the fertilizer of greater amounts of relatively cheap ammonia nitrogen. It would also mean that lesser amounts of costly potassium sulfate would be required to eliminate calcium nitrate from the product.

It has been found to be very difficult, when proceeding according to the methods of the prior art (British Patent 639,783, for example) to add even the stoichiometric amount of ammonia required to precipitate all the $P_2O_5$ as dicalcium phosphate and all the fluorine as calcium fluoride without forming excessive amounts of phosphates that are insoluble in neutral ammonium citrate.

The drying of products produced by the methods of the prior art has also been found to be difficult. An economical and simple method for drying materials of the type described involved heating them in a high-temperature, direct-fired rotary drier and maintaining the materials in a fluid state until most of the moisture has been removed. Such a method cannot be employed with materials produced by the method of British 639,783, because the mixture thickens and becomes pasty before an appreciable amount of moisture can be driven off. With such materials it has been necessary to carry out the drying step at low temperature in a tray drier or the like, or to mix the undried material with several times its weight of previously dried material and dry the mixture in a rotary drier. Both of these methods are uneconomical.

It is an object of this invention to provide a method for ammoniating a slurry formed by extracting phosphate rock with nitric acid whereby at least the stoichiometric amount of ammonia required to precipitate the $P_2O_5$ as dicalcium phosphate and the fluorine as calcium fluoride may be added without substantially reducing the proportion of $P_2O_5$ soluble in neutral ammonium citrate.

Another object is to provide a method for treating an extract slurry of phosphate rock and nitric acid with ammonia and potassium sulfate whereby a dry fertilizer product having good physical properties can be obtained by economical high-temperature drying methods.

Still another object is to provide a method for treating an extract slurry of phosphate rock and nitric acid with ammonia and potassium sulfate whereby a minimum of potassium sulfate is needed to eliminate calcium nitrate from the product.

I have found that if I extract phosphate rock with nitric acid and add ammonia and a material selected from the group consisting of potassium sulfate, ammonium sulfate, and sodium sulfate concomitantly to the extract, I am able to incorporate more than the stoichiometric amount of ammonia required to precipitate the $P_2O_5$ and fluorine in the slurry as dicalcium phosphate and calcium fluoride, respectively, without adversely affecting the solubility of the $P_2O_5$.

This process comprises admixing phosphate rock with at least enough nitric acid to convert the phosphate content of the rock to monocalcium phosphate; evenly distributing in the resulting slurry an amount of ammonia at least equal to that theoretically required to precipitate all phosphate present in the form of dicalcium phosphate and to precipitate all fluorine present in the form of calcium fluoride; evenly distributing in the slurry, concomitant with distribution of ammonia or prior thereto, an amount of a material selected from the group consisting of potassium sulfate, ammonium sulfate, sodium sulfate, and mixtures thereof, effective to maintain a very high proportion of phosphate present in sodium citrate soluble form; and drying the resulting mixture.

In the attached drawings, Figure 1 is a graph showing how the addition of potassium sulfate to a phosphate rock-nitric acid extract increases the amount of ammonia that can be added to the extract without adversely affecting $P_2O_5$ solubility.

Figure 2:
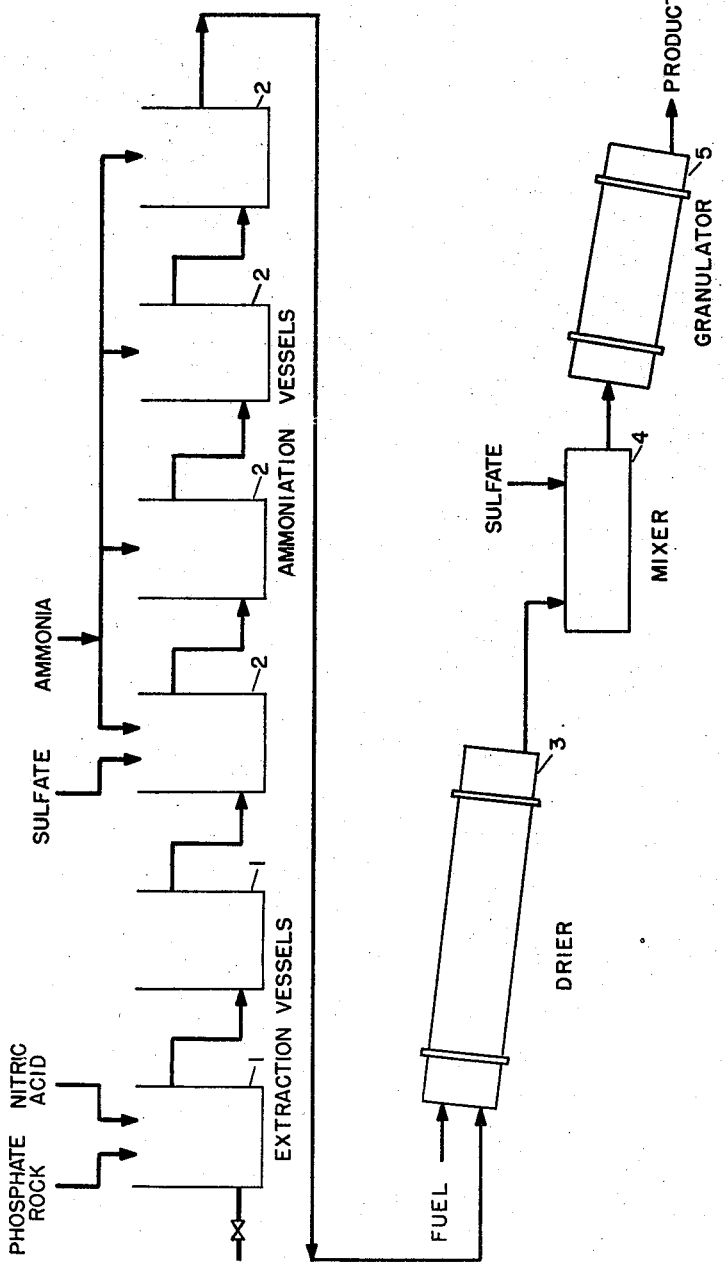

Figure 2 is a flow diagram illustrating a preferred method for carrying out a process embodying my invention.

The curves plotted in Figure 1 are the result of a series of tests carried out in laboratory apparatus. Florida phosphate rock that contained 47.2 percent CaO, 32.2 percent $P_2O_5$, and 3.5 percent F was used in these tests. Nitric acid containing 42 percent $HNO_3$ was used to acidulate the rock, and gaseous ammonia was used for ammoniation. In those tests in which potassium sulfate was added, commercial potassium sulfate having a $K_2O$ content of 50.6 percent was used.

Extraction of rock with acid was carried out batchwise, but ammoniation was carried out in a continuous manner. The ammoniation apparatus consisted of four 4000 milliliter Florence flasks, arranged in series, each equipped with a 2-inch diameter propeller agitator. Each flask had a slurry inlet in the bulb of the flask and a slurry outlet in the neck of the flask which was connected to the slurry inlet of the succeeding flask. An ammonia inlet tube projected through the wall of each flask and terminated at a point just outside the arc of the propeller agitator, which was positioned about 2 inches above the bottom of the flask. Valves controlling the flow of ammonia to individual flasks were adjusted so that 50 percent of the ammonia was admitted to the first flask, 30 percent to the second, 10 percent to the third, and 10 percent to the fourth. Previous trials had shown this apparatus to be highly satisfactory for laboratory-scale ammoniation of phosphate rock-nitric acid extract slurries.

For each of the tests carried out to obtain the data represented graphically in Figure 1, a batch of about 100 pounds of slurry was made up by treating phosphate rock with nitric acid in the proportions of 235 grams of 42 percent nitric acid (98.7 grams $HNO_3$) per 100 grams of dry phosphate rock. The extract slurry was fed continuously from an agitated tank to the first ammoniation vessel at a constant rate of about 400 grams per minute. The retention time of the ammoniation system at this rate of slurry input was approximately 1 hour. Ammonia was introduced at a constant rate which had been calculated to give the desired degree of ammoniation. Each ammoniation run was continued for about 4 hours.

In those runs in which potassium sulfate was added during ammoniation, a predetermined amount of commercial potassium sulfate was introduced into the first ammoniation vessel in increments of about 70 grams at intervals of 1 to 2 minutes. This procedure closely approximated continuous addition of potassium sulfate.

The slurry discharged from the fourth ammoniation vessel was collected for later use in carrying out drying tests. Samples of the slurry were analyzed for total $P_2O_5$, citrate-soluble $P_2O_5$, total nitrogen, and ammoniacal nitrogen. From the analytical results the $P_2O_5$ availability in percent (citrate-soluble $P_2O_5$ divided by total $P_2O_5$) and the degree of ammoniation in terms of grams of ammonia per 100 grams of phosphate rock were calculated.

Calculations show that with the phosphate rock used in these tests and the amount of nitric acid used to acidulate the rock, 16.6 grams of ammonia per 100 grams of phosphate rock are required to precipitate all the $P_2O_5$ in the slurry as dicalcium phosphate and all the fluorine as calcium fluoride. This stoichiometric amount of ammonia is represented in Figure 1 as vertical line $e$.

In the tests represented by curve $a$, no potassium sulfate was added during ammoniation of the extract slurry. It will be noted that when the slurry was ammoniated to a degree corresponding to about 83 percent of stoichiometric, all the $P_2O_5$ in the ammoniated slurry was in available form, presumably as dicalcium and monocalcium phosphates. As the degree of ammoniation was increased above 83 percent of stoichiometric, the $P_2O_5$ availability decreased, indicating that phosphatic compounds insoluble in neutral ammonium citrate had been formed. At 100 percent stoichiometric ammoniation, the $P_2O_5$ availability was only 91 percent.

In the tests represented by curve $b$, commercial potassium sulfate was introduced into the first ammoniation vessel at a rate of 19 grams per 100 grams of phosphate rock. It is evident that in these tests $P_2O_5$ availability was decreased to a lesser extent by increasing degree of ammoniation than in the tests in which no potassium sulfate was added during ammoniation. At 100 percent ammoniation the $P_2O_5$ availability was nearly 98 percent.

Curves $c$ and $d$ represent tests in which 39.3 and 65.5 grams of commercial potassium sulfate, respectively, per 100 grams of phosphate rock were added in the first ammoniator. It was necessary, in the latter series of tests, to dilute the slurry with water to prevent undue thickening.

These tests demonstrate that by adding potassium sulfate during ammoniation, it is possible to add more than the stoichiometric quantity of ammonia without markedly decreasing $P_2O_5$ availability. It is postulated that in the presence of the potassium sulfate, citrate-soluble phosphatic compounds are precipitated that have a higher ratio of CaO to $P_2O_5$ than does dicalcium phosphate in which the $CaO:P_2O_5$ mole ratio is 2.0. Addition of ammonium sulfate or sodium sulfate also results in increase in citrate solubility of $P_2O_5$ in the product, and when the effects are plotted will give curves similar to $b$, $c$, and $d$.

A preferred method for carrying out a process embodying my invention is illustrated in Figure 2. While the following description shows the addition of potassium sulfate in the preparation of a fertilizer it is to be understood that a quantity, equivalent on the basis of sulfate content, of any material selected from the group consisting of potassium sulfate, ammonium sulfate, sodium sulfate, and mixtures thereof may be employed where potassium sulfate is mentioned if desired. The novel result of high availability of $P_2O_5$ in a highly ammoniated product will still be obtained. Potassium sulfate is the material of choice when the presence of a substantial proportion of potassium is desired in the product.

In this process phosphate rock and nitric acid are introduced continuously into the first of two extraction vessels 1 equipped with suitable agitators (not shown). Partially reacted slurry from the first vessel is overflowed to the second vessel, in which the reaction between rock and acid goes to completion. The completely reacted extract slurry is overflowed from the second vessel and is conducted to the first of four ammoniation vessels 2, also equipped with agitators (not shown). Gaseous ammonia is introduced continuously into the slurry in each of the ammoniation vessels. The flow of ammonia preferably is adjusted so that about 50 percent is introduced in the first vessel, 30 percent in the second, 10 percent in the third, and 10 percent in the fourth. From 100 to 120 percent of the amount of ammonia stoichiometrically required to precipitate all the $P_2O_5$ and all the fluorine in the slurry as dicalcium phosphate and calcium fluoride, respectively, is added to the slurry in the ammoniation vessels.

Potassium sulfate is added continuously in the first ammoniation vessel. The quantity of potassium sulfate added at this point is that amount that will give a weight ratio of $K_2O$ to $P_2O_5$ in the slurry of 0.2 to 0.55.

The slurry discharged from the fourth ammoniation vessel is transferred to drier 3. Drier 3 is preferably a concurrent direct-fired rotary drier. The drying operation is carried out so that the material discharged from the drier contains from 4 to 8 percent moisture and is in a fluid condition.

The fluid material discharged from the drier is transferred to mixer 4, wherein the remainder of the potassium sulfate required to eliminate calcium nitrate is mixed with the material. Mixer 4 may be a pug mill or the like and is provided with means, such as a steam jacket, for keeping the material within the mixer hot enough to retain its fluid condition. Sufficient moisture remains in the material fed to the mixer so that the potassium sulfate added is dissolved and reacts with the calcium nitrate present to yield calcium sulfate and potassium nitrate.

Material discharged from mixer 4, having a moisture content of 2 to 4 percent, is finally transferred to rotary granulator 5. Within granulator 5 the material is cooled to solid form and is granulated. The product discharged from the granulator is in the form of granules and is ready for bagging.

The amount of nitric acid used to extract the phosphate rock may be varied within rather broad limits. At least enough acid should be employed to convert the $P_2O_5$ in the rock to monocalcium phosphate. Increasing the amount of nitric acid will result in increased conversion of rock $P_2O_5$ to phosphoric acid, until a point is reached at which all the $P_2O_5$ has been converted to phosphoric acid. Further addition of nitric acid beyond that point may be made, but the end result of such addition is merely to increase the ammonium nitrate content of the product.

The concentration of acid used in acidulating the rock is of considerable importance. In order to minimize drying costs it is desirable to use as strong an acid as possible. On the other hand, the process is easier to carry out if thin slurries rather than relatively thick, pasty masses are handled. To this end, it is desirable to use a relatively dilute acid. It has been found that the use of nitric acid containing about 40 to 44 percent $HNO_3$ represents a good compromise between these opposing factors. If desired, stronger acid may be used to extract the rock; the extract slurry may then be diluted as needed to prevent undue thickening of the material undergoing ammoniation.

Extensive studies of methods for ammoniating phosphate rock-nitric acid extract slurries have led to the development by co-workers, and prior to my invention, of a method whereby nearly 100 percent of the stoichiometric amount of ammonia required to precipitate $P_2O_5$ as dicalcium phosphate and fluorine as calcium fluoride can be added without reducing $P_2O_5$ availability below about 95 percent. This method comprises carrying out the ammoniation in four stages and distributing the ammonia flow so as to introduce about 50 percent in the first stage, 30 percent in the second stage, 10 percent in the third stage, and 10 percent in the fourth stage. This method of ammoniating extract slurries has been found to be well-suited to the process of my invention, wherein potassium sulfate is added simultaneously with ammonia. Ammoniation, with accompanying addition of potassium sulfate, may also be carried out in three stages. In three-stage ammoniation it is preferable to distribute the ammonia so as to introduce about 50 percent in the first stage, 30 percent in the second, and 20 percent in the third stage.

It is essential that the slurry undergoing ammoniation and addition of potassium sulfate be thoroughly agitated to ensure uniform distribution of ammonia and potassium sulfate.

As shown by Figure 1, the amount of ammonia that can be added to the extract slurry without unduly reducing the $P_2O_5$ availability is proportional to the amount of potassium sulfate added with the ammonia. Practical considerations, however, limit the amount of potassium sulfate that can be added during the ammoniation stage. The most important limitation is imposed by the fact that high-temperature drying cannot be employed if the material being dried has such a high content of solid materials that it thickens and forms large lumps within the drier. The amount of potassium sulfate that can be added during ammoniation without causing difficulty in the high-temperature drying step cannot be stated precisely because the amount is influenced by several factors. As will be explained more fully hereinafter in connection with the discussion on drying, the proportion of ammonium and calcium nitrates in the slurry undergoing drying has an important effect on thickening in the drier.

In the treatment of a given phosphate rock, the proportion of ammonium and calcium nitrates in the slurry undergoing drying is influenced by the amount of nitric acid used in acidulating the phosphate and the amount of potassium sulfate added during ammoniation. Thus, increasing the amount of nitric acid used in extracting the rock increases the amount of potassium sulfate that can be added during ammoniation without causing undue thickening in the drying step. The particular type of rock used also has an effect on the maximum amount of potassium sulfate to be added during ammoniation. It will be evident, therefore, that the optimum amount of potassium sulfate to be added during ammoniation can best be determined by experiment.

In my studies, using Florida phosphate rock containing 32.2 percent $P_2O_5$ and acidulating with 2.35 parts of 42 percent nitric acid per 1 part of phosphate rock, it was found that addition of more than the amount of potassium sulfate needed to give a weight ratio of $K_2O$ to $P_2O_5$ of 0.55 during ammoniation caused balling and caking during the high-temperature drying step. At least enough potassium sulfate to give a $K_2O:P_2O_5$ weight ratio of 0.20 was needed to obtain the benefits of high $P_2O_5$ availability and higher-than-stoichiometric ammoniation. If it is desired to use a drying method other than the high-temperature method, all the potassium sulfate needed to eliminate calcium nitrate from the product may be added during ammoniation. Additions above about 0.75 part of $K_2O$ per part of $P_2O_5$ cause gellation during ammoniation, however, and it is necessary to dilute the slurry with water in order to continue ammoniation.

The effect of higher-than-stoichiometric ammoniation on the total amount of potassium sulfate required to eliminate calcium nitrate is shown by comparison between the following Reactions 4 and 5 with Reactions 2 and 3 above. In this illustration the products of Reaction 1 are reacted with 12 moles of ammonia instead of 10 moles as in Reaction 2.

(4) $2CaH_4(PO_4)_2 + 2H_3PO_4 + 8Ca(NO_3)_2$
$+ 2HF + 12NH_3 \rightarrow 4CaHPO_4 + Ca_3(PO_4)_2$
$+ 12NH_4NO_3 + 2Ca(NO_3)_2 + CaF_2$ (5) $3CaHPO_4 + Ca_3(PO_4)_2 + 12NH_4NO_3 + 2Ca(NO_3)_2$
$+ CaF_2 + 2K_2SO_4 \rightarrow 4CaHPO_4 + Ca_3(PO_4)_2$
$+ 12NH_4NO_3 + 4KNO_3 + 2CaSO_4 + CaF_2$ It will be seen that, in the illustration chosen, an increase in degree of ammoniation of 20 percent reduces the amount of potassium sulfate required to eliminate calcium nitrate by one-third. This saving in potassium sulfate is of importance because potassium sulfate is a costly source of potash as compared to potassium chloride. The potash content of the final fertilizer may be increased above that furnished by potassium sulfate, if desired, by adding the less costly potassium chloride.

Because it contains less calcium sulfate, the product is more concentrated.

It is preferable to add the potassium sulfate in the first ammoniation stage, because only one feeder is required. If desired, however, the potassium sulfate may be added in more than one stage, but at least some must be added in the first-stage ammoniator.

Ammonium nitrate and calcium nitrate will dissolve in very small amounts of water at elevated temperatures. It is this property that permits the drying of slurries containing ammonium nitrate, calcium nitrate, and other materials to a low moisture content while maintaining the mixture in a fluid condition. The degree to which such slurries can be dried, however, is dependent on the proportion of ammonium nitrate and calcium nitrate in the mixture.

When slurries containing ammonium nitrate, calcium nitrate, potassium nitrate, calcium sulfate, calcium phosphate, and water are dried to a moisture content of 4 to 8 percent at temperatures sufficiently high that a liquid phase is present, the liquid phase consists almost entirely of a solution of ammonium and calcium nitrates in water. The liquid phase contains, in addition to ammonium and calcium nitrates, a very small proportion of dissolved potassium nitrate. Most of the potassium nitrate, however, is present in the solid phase. Whether or not a mixture containing the above materials is fluid at a given temperature and moisture content depends, therefore, on the proportion of ammonium and calcium nitrates in the mixture.

In order to obtain efficient transfer of heat from the hot gas to the materials being dried, the material should be in a highly fluid condition throughout the entire length of the drier. If the material becomes thick and rolls up into lumps, the rate of transfer of heat to the material becomes very low.

The moisture content of the material discharged from the drier should be within the range of about 4 to 8 percent. Materials having an initial moisture content within this range contain about 2 to 4 percent moisture after the remainder of the potassium sulfate needed to eliminate calcium nitrate has been added. After the mixture has been cooled and granulated, it is free-flowing and dry to the touch. If the moisture content of the drier discharge exceeds about 8 percent, the final product is sticky and requires further drying. If the moisture content of the material from the drier is less than about 4 percent, there is insufficient water present to permit reaction between the added potassium sulfate and the calcium nitrate, and the final product contains unreacted calcium nitrate and potassium sulfate.

The amount of potassium sulfate to be added to the material discharged from the drier is determined, of course, by the amount of calcium nitrate remaining in the material. The calcium nitrate content may be determined from a chemical analysis of the mixture. It may be desirable to add 2 or 3 percent more than the theoretical requirement of potassium sulfate to ensure substantially complete elimination of calcium nitrate from the final product.

The mixer in which the partially dried slurry is mixed with potassium sulfate should be provided with means for keeping the slurry hot so that the slurry will remain fluid during mixing. A steam-jacketed pug mill is a satisfactory device for this purpose. Potassium chloride that may be needed to increase the potash content of the fertilizer product may also be added in the mixer.

Commercial potassium sulfate contains varying quantities of CaO and MgO; only the sulfate in excess of that combined with the lime and magnesia is effective in eliminating calcium nitrate. This must be taken into account in determining how much commercial potassium sulfate is needed to react with calcium nitrate. Precipitation of calcium sulfate in this manner also helps remove moisture from the product by hydration. Thus it may be possible to leave 3 or 4 percent more moisture in the product from the drier than is desired in the final product if potassium sulfate is added to the melt in quantity to cause its removal as hydrated calcium sulfate.

The mixture discharged from the mixer may be cooled and granulated simply by passing it through a rotary drum. The particle size of the material leaving the drum may be controlled by placing steel rods, slightly shorter than the drum, inside the drum. By varying the number and/or weight of the rods, product of the desired particle size characteristics can be made.

*Example*

To determine the exact technique required by methods of the prior art, several tests of the method disclosed in British Patent 639,783 were carried out during the course of my studies. In one of these tests Florida phosphate rock containing 47.2 percent CaO, 32.2 percent $P_2O_5$, and 3.5 percent F was extracted with 42 percent nitric acid. Rock and acid were added in the proportion 235 grams of acid per 100 grams of dry rock. The extract slurry was fed to the continuous, four-stage ammoniation apparatus described previously at a rate of 400 grams per minute. Anhydrous gaseous ammonia was added at a rate of 19.9 grams per minute (9.9 grams per minute in the first stage, 6.0 in the second, 2.0 in the third, and 2.0 in the fourth stage). This ammoniation rate was calculated to precipitate all the $P_2O_5$ present as dicalcium phosphate and all the fluorine as calcium fluoride. The ammoniated slurry contained 9.0 percent total $P_2O_5$, 8.6 percent citrate-soluble $P_2O_5$, 6.2 percent nitrate N, and 3.9 percent ammonia N. Potassium sulfate containing 50.6 percent $K_2O$ was added to the ammoniated slurry at a rate of 61.6 grams per 420 grams of slurry. The rate of addition of potassium sulfate was that calculated to react with and eliminate calcium nitrate from the mixture.

Attempts to dry the mixture in a rotary drier heated with combustion gases at 500° F. were unsuccessful. The slurry balled and caked in the drier, and emerged as large soft lumps which, upon cooling, were soft and gummy.

A portion of undried mixture was placed in a tray drier and after 4 hours, during which time the material was stirred intermittently, a dry product consisting of large lumps was obtained. The dry product contained 11.5 percent total $P_2O_5$, 11.0 percent citrate-soluble $P_2O_5$, 8.0 percent nitrate N, 5.0 percent ammonia N, and 9.6 percent $K_2O$. The product was relatively nonhygroscopic.

In another test in which my preferred procedure was followed, a nitric acid-phosphate rock extract of the same composition as that described above was fed to the four-stage ammoniator at a rate of 400 grams per minute. Commercial potassium sulfate (50.6 percent $K_2O$) was added to the first ammoniation vessel in 40-gram increments to simulate a continuous rate of addition of 39.3 grams $K_2SO_4$ per minute. Anhydrous gaseous ammonia was added continuously at a rate of 23 grams per minute (11.5 grams per minute in the first stage, 6.9 in the second, 2.3 in the third, and 2.3 in the fourth stage). The slurry was discharged from the fourth ammoniation vessel at a rate of 462.3 grams per minute and contained 8.1 percent total $P_2O_5$, 7.9 percent citrate-soluble $P_2O_5$, 5.7 percent nitrate N, 4.1 percent ammonia N, and 4.3 percent $K_2O$.

This slurry was dried in a rotary drier which consisted of an insulated aluminum shell 8 feet long, 12 inches inside diameter. The drier was equipped with twelve Z-shaped flights that started at a point 18 inches from the feed end of the drier and extended to the discharge end. Retaining rings or dams 1 inch high were installed at the quarter points of the drier to prevent the slurry feed from flowing down the flights to the discharge end. Heat for drying was furnished by burning carbon monoxide gas in a combustion chamber and passing the products on combustion into the drier at the slurry-feed end. Compressed air was mixed with the combustion products to regulate the temperature of the gases.

The drier had a capacity slightly greater than the capacity of the ammoniation apparatus. Ammoniated slurry was collected in tanks and then fed from the tanks at a rate of about 520 grams per minute, or about 1.1 times the rate of production of ammoniated slurry. At this rate, the slurry remained within the drier for approximately one hour.

In the test, the average temperature of the combustion gases entering the drier was 500° F. The material discharged from the drier was in the form of a viscous fluid. The temperature of the fluid was about 250° F., and the moisture content was approximately 5 percent.

The fluid slurry discharged from the drier was fed to a steam-jacketed kettle fitted with a revolving scraper where additional potassium sulfate was added at a rate of 10 grams per minute. This rate of potassium sulfate addition was calculated to completely eliminate calcium nitrate from the product. After 5 minutes of mixing in the kettle, the still hot and fluid slurry was fed to a rotating cylinder containing a loose steel rod. In the rotating cylinder the slurry was cooled and pelletized, and a hard, granular product was discharged. The product was substantially minus 6-mesh in particle size, and had the following composition as determined by chemical analysis: 11.9 percent total $P_2O_5$, 11.6 percent citrate-soluble $P_2O_5$, 8.3 percent nitrate N, 6.0 percent ammonia N, and 7.7 percent $K_2O$.

It will be seen that by my novel process it was possible to add 15.6 percent more ammonia than was required to precipitate all the $P_2O_5$ and the fluorine in the slurry as dicalcium phosphate and calcium fluoride, respectively. This degree of ammoniation was achieved without sacrifice in $P_2O_5$ availability; 97.5 percent of the $P_2O_5$ in the product was soluble in neutral ammonium citrate. The amount of potassium sulfate required to eliminate calcium nitrate was 23.0 percent less than was required by the method of the prior art.

The heat required to obtain a dry product by my process is considerably less than is needed in the prior methods which involve drying in a tray drier. In my process about 600 B.t.u. is needed per pound of product to dry the material. With the tray-drying method, about 1000 B.t.u. per pound of product is required to remove the same amount of moisture.

Ammonium sulfate or sodium sulfate may be used in my process to replace at least a part of the potassium sulfate, if desired. The use of ammonium sulfate results in a product having a high ratio of nitrogen to phosphorus. Since sodium is not ordinarily considered to be a fertilizing element, the use of sodium sulfate would not be of advantage except under special circumstances, such as where the relative costs of sodium sulfate and potassium sulfate would make it advantageous to use the sodium salt. In addition, it may be desirable to use sodium sulfate in preparing fertilizers to be used with crops such as sugar beets and cotton.

I claim as my invention:

1. In a process for the production of fertilizer wherein phosphate rock is mixed with at least enough nitric acid to convert the calcium phosphate content of said rock to monocalcium phosphate, ammonia is added to the resulting slurry, calcium nitrate is present in the slurry after ammoniation, a soluble sulfate in quantity sufficient to convert all calcium nitrate present to calcium sulfate is added to the slurry after ammoniation, and the slurry is dried, that improvement which comprises conducting ammoniation by evenly distributing in the slurry an amount of ammonia from about 1.0 to 1.2 times that theoretically required to precipitate all phosphate present in the form of dicalcium phosphate and all fluorine present as calcium fluoride in the presence of sufficient potassium sulfate to give a $K_2O/P_2O_5$ mole ratio of about 0.2:1 to 0.55:1 in the slurry; precipitating some calcium as citrate-soluble phosphatic compounds having a $CaO/P_2O_5$ mole ratio greater than that of dicalcium phosphate; drying the resulting slurry to a moisture content of about 4 to 8 percent at a temperature high enough to maintain the slurry in fluid state; mixing sufficient potassium sulfate with the resulting hot, fluid slurry to react with all calcium nitrate present; and cooling and granulating the resulting mixture.

2. The process of claim 1 wherein a material selected from the group consisting of ammonium sulfate, sodium sulfate, and mixtures thereof in amounts equivalent on the basis of sulfate content to the amounts of potassium sulfate recited in said claim is substituted for potassium sulfate.

References Cited in the file of this patent

UNITED STATES PATENTS

| | | |
|---|---|---|
| 1,788,828 | Goldberg et al. | Jan. 13, 1931 |
| 1,806,029 | Thorssell | May 19, 1931 |
| 1,834,454 | Johnson | Dec. 1, 1931 |
| 1,849,704 | Boller | Mar. 15, 1932 |
| 1,854,291 | Burdick | Apr. 19, 1932 |
| 1,894,767 | Harvey | Jan. 17, 1933 |
| 1,948,520 | Harvey | Feb. 27, 1934 |

FOREIGN PATENTS

| | | |
|---|---|---|
| 282,330 | Great Britain | May 31, 1928 |
| 355,637 | Great Britain | Aug. 27, 1931 |
| 391,495 | Great Britain | May 1, 1933 |